CHARLEY LOWERY
INVENTOR.

CHARLEY LOWERY
INVENTOR.

BY *Jerry J Dunlap*

ATTORNEY

United States Patent Office 2,971,604
Patented Feb. 14, 1961

2,971,604

SYSTEM FOR SEPARATING THE OIL, GAS, AND WATER IN A CRUDE OIL STREAM

Charley Lowery, Rte. 8, Box 153, Oklahoma City, Okla.

Filed Jan. 2, 1959, Ser. No. 784,476

4 Claims. (Cl. 183—2.7)

This invention relates generally to improvements in the art of separating the oil, gas and water components in a crude oil stream, and more particularly, but not by way of limitation, to a novel heater construction for crude oil wash tanks.

In applicant's recently issued United States Patent No. 2,852,139, there is disclosed a heater construction for a crude oil wash tank wherein the free water in a crude oil stream is subjected to a minimum amount of heat produced by the heater and is separated immediately upon entering a wash tank; a heater construction wherein the various elements of the heater may expand and contract with varying temperature conditions without damage to any portion of the heater or wash tank; and a heater construction wherein salt precipitating from the brine water in a crude oil wash tank will be effectively removed from the upper portion of the heater to provide an efficient transfer of heat from the heater into the contents of the wash tank. This heater construction provides an effective separation of the components of a crude oil stream in a large percentage of operating conditions and provides an important advance in the art. However, when the crude oil stream contains a substantial amount of free gas, the gas is passed through the brine water and around the heater in the wash tank, as in other present day crude oil wash tank assemblies, such that the gas tends to agitate the oil and water in the wash tank and hinder an efficient stratification of the oil in the upper portion of the wash tank.

The present invention is an improvement on the structure disclosed and claimed in the above-mentioned patent to provide a more complete separation of the oil, water and gas in a crude oil stream under substantially all operating conditions. More specifically, the present invention contemplates a system for separating the components in a crude oil stream wherein the free gas is separated from the remainder of the crude oil upstream of the wash tank and is then directed into the upper end portion of the wash tank to minimize the agitation of the contents of the wash tank and facilitate separation of the oil and water components of the stream. The present invention also contemplates a heater construction wherein the heater extends a substantial distance out of the wash tank, as well as a substantial distance into the wash tank, and the crude oil stream is passed through the heater around the fire box for a substantial distance prior to the introduction of the stream into the wash tank. This elongated flow path for the crude oil stream around the heater facilitates a more complete separation of the oil and water components of the stream, yet provides a minimum heating of the free water in the crude oil stream to provide an efficient use of the heat generated by the heater and a more effective use of the wash in the crude oil wash tank.

A general object of this invention is to efficiently and economically separate the oil, gas and water components of a crude oil stream.

Another object of this invention is to provide a system for separating the components of a crude oil stream by use of a crude oil wash tank wherein the free gas in the crude oil stream is separated upstream of the wash tank and by-passed around the wash tank.

Another object of this invention is to minimize the agitation of the oil and water in a crude oil wash tank.

A further object of this invention is to efficiently heat the oil and water components of a crude oil stream entering and flowing through a crude oil wash tank.

Another object of this invention is to provide a substantially complete separation of the water from a crude oil stream prior to injection of the stream into a crude oil wash tank.

A still further object of this invention is to provide a system for separating the oil, gas and water components in a crude oil stream which is simple in construction, which may be economically manufactured and which will have a long service life.

Other objects and advantages of the invention will be evident from the following detailed description, when read in conjunction with the accompanying drawings which illustrate my invention.

Figure 1:
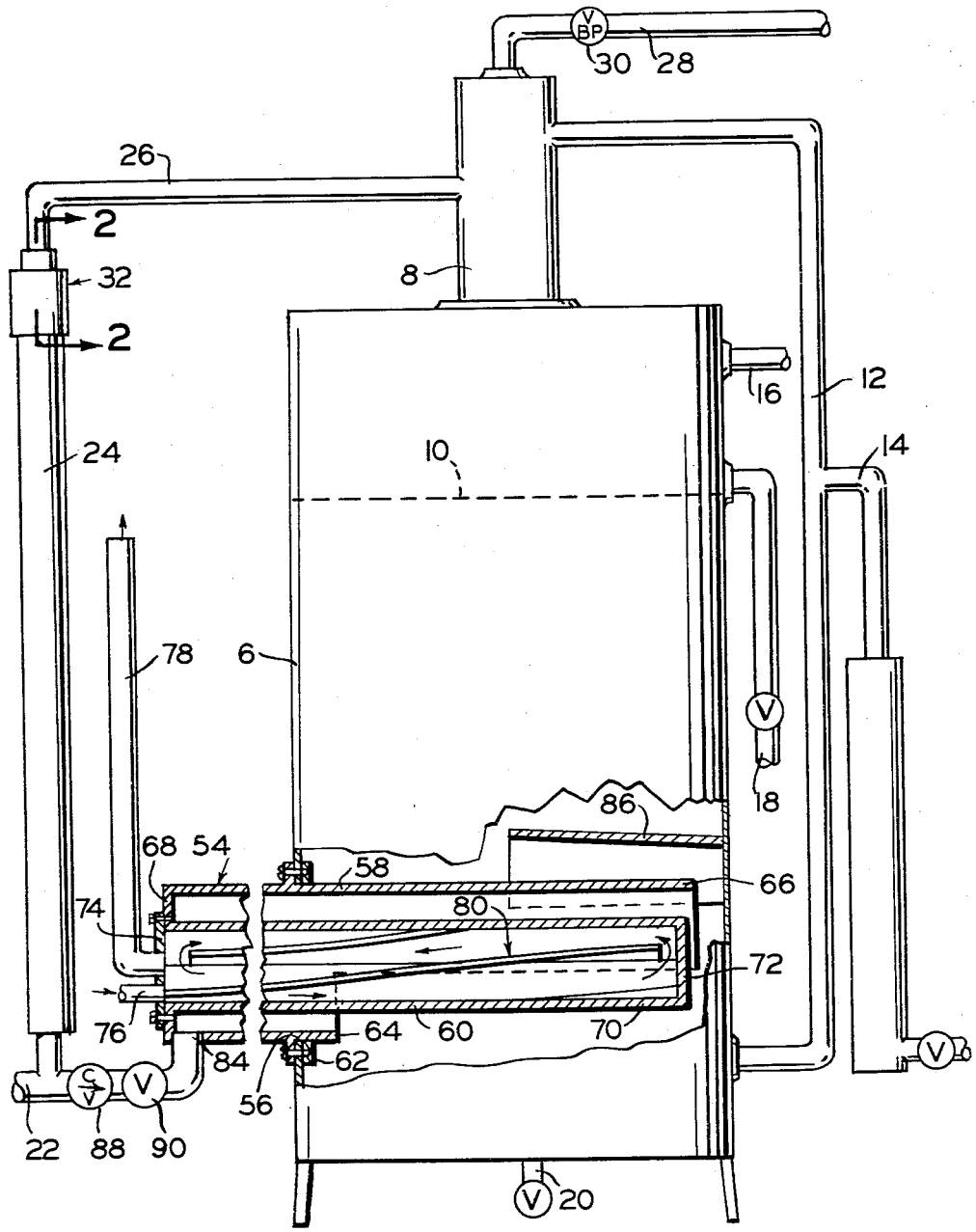
Figure 1 is an elevational view of a system constructed in accordance with this invention, with the heater being shown in section to illustrate details of construction.

Referring to the drawings in detail, and particularly Fig. 1, reference character 6 designates a crude oil wash tank having a hollow gas dome 8 on the upper end thereof communicating with the upper end of the tank 6 for purposes which will be hereinafter set forth. The wash tank 6 normally contains brine water and oil, with the brine water extending from the bottom of the tank up to a level designated by reference character 10, and with the oil on top of the brine water. The level 10 of the brine water is maintained by a conduit 12 communicating with the gas dome 8 and the lower portion of the wash tank 6, and a drain conduit 14 communicating with the conduit 12 at the height of the level 10. It will therefore be apparent that when the level 10 of the brine water tends to rise above the upper end portion of the conduit 14, a portion of the brine water will flow from the lower portion of the wash tank 6 upwardly through the conduit 12 and then downwardly through the conduit 14. The conduit 14 communicates with any suitable disposal point for the brine water.

The separated oil is removed from the wash tank 6 through an outlet 16 communicating with the upper portion of the wash tank 6 above the level 10. Also, another drain line 18 communicates with the wash tank 6 at about the level 10 of the brine water for periodically removing sediment which may collect on the upper surface of the brine water. The entire contents of the wash tank 6 may be drained through an outlet 20 communicating with the bottom of the tank when, for example, it is desired to clean the tank.

The crude oil stream to be separated is directed to the wash tank 6 through a suitable conduit 22 leading from one or more oil wells. A riser 24, preferably having a larger diameter than the conduit 22, extends vertically upward from the conduit 22 upstream of the wash tank 6 to provide a removal of free gas from the crude oil stream prior to the feeding of the stream into the wash tank. The riser 24 extends upward to a level above the top of the wash tank 6 and is connected by a conduit 26 to the gas dome 8 of the wash tank. It will thus be observed that free gas in the crude oil stream being fed to the wash tank 6 will tend to rise and will so rise through the riser 24 and then pass through the conduit 26 into the gas dome 8, such that a minimum amount of gas will be passed through the brine water and oil in the wash tank 6 to interfere with the efficient stratification of the brine water and oil in the wash tank. This free gas, as well as a minor portion of gas which is released from the crude oil stream in the wash tank 6, is fed through an outlet 28 leading from the dome 8 to a suitable gas gathering system. A back pressure valve 30 is normally interposed in the conduit 28 to retain a slight pressure on the wash tank 6 and minimize the possibility of air entering the tank and forming an explosive mixture.

Figure 2:
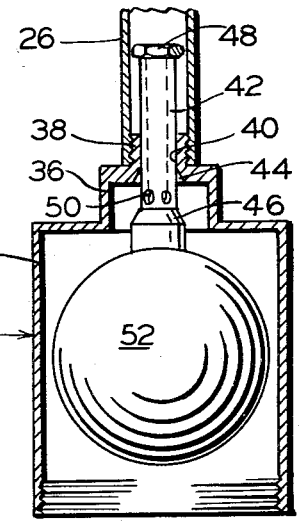
Figure 2 is a sectional view as taken along lines 2—2 of Fig. 1.

As most clearly shown in Fig. 2, I prefer to provide a check valve assembly (generally designated by reference character 32) at the upper end of the gas riser 24. The assembly 32 comprises a suitable hollow cover or housing 34 which is threaded at its lower end for connection with the upper end of the gas riser 24. The upper end portion 36 of the housing 34 is reduced in diameter and provided with a threaded coupling 38 on the central portion thereof for connection with the lower end of the conduit 26. An aperture or bore 40 is formed through the center of the upper end 36 of the housing 34 in alignment with the bore through the coupling 38 to slidingly receive a hollow stem 42. The lower end portion of the bore 40 is tapered downwardly and outwardly to form a valve seat 44 for receiving a complementary-shaped portion or valve head 46 secured on the lower end of the stem 42. Also a suitable nut or head 48 is provided on the upper end of the stem 42 to contact the upper end of the coupling 38 and limit the downward movement of the stem 42. It will be apparent that the head 48 fits loosely in the conduit 26 and will not interfere with vertical movement of the stem 42. Also, the stem 42 is of a size to provide a sliding fit thereof in the bore 40 in the upper end of the housing 34.

A plurality of transverse apertures 50 are formed through the side of the stem 42 slightly above the valve head 46 to provide communication between the housing 34 and the conduit 26 when the valve head 46 is moved downwardly with respect to the seat 44. When the head 46 is seated on the seat 44, the apertures 50 are disposed in the coupling 38, and flow of fluid from the housing 34 upwardly into the conduit 26 is prohibited.

A suitable float 52 is secured on the lower end of the stem 42 below the valve head 46 to actuate the valve assembly. The float 52 is of such a size and specific gravity to be raised when liquid rises in the riser 24 into proximity with the valve seat 44. Thus, when only gas is present in the upper end portion of the riser 24, the float 52 will fall by gravity to move the stem 42 downwardly through the bore 40 until the head 48 contacts the upper end of the coupling 38. Under these conditions, the apertures 50 are exposed below the seat 44, such that gas may flow from the riser 24 through the housing 34 and the stem 42 into the conduit 26. However, if liquid tends to rise to an excessively high level in the riser 24, this liquid will raise the float 52 and seat valve head 46 on the valve seat 44 to prevent communication between the riser 24 and conduit 26. The check valve assembly 32 therefore prevents a bypass of oil and water around the wash tank 6, in the event an excessive amount of fluid is attempted to be passed through the tank, or in the event the various outlets from the wash tank become clogged for any reason.

Figure 3:
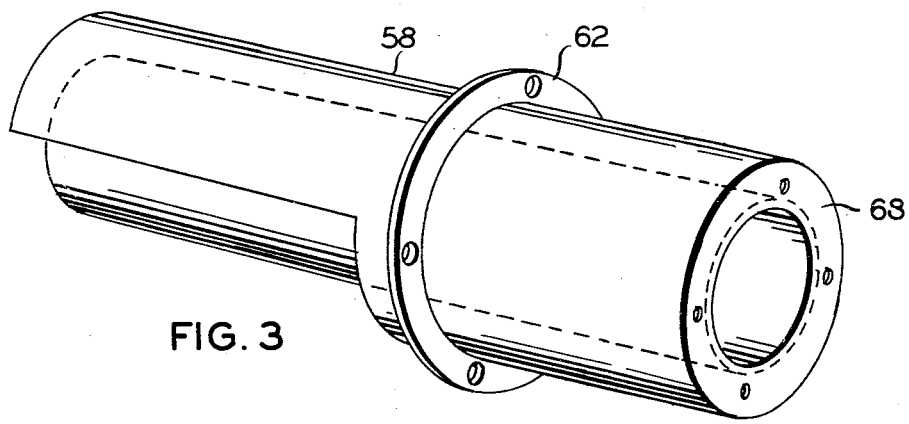
Figure 3 is a perspective view of the heater construction.

A novel heater 54 (Fig. 1) extends horizontally through an opening 56 formed in the side of the wash tank 6 near the lower end of the wash tank substantially below the level 10 of the brine water. The heater 54 generally comprises a tubular shield 58 and a tubular fire box 60 secured substantially concentrically in the shield 58. As shown in Figs. 1 and 3, the shield 58 is of substantial length and is provided with suitable flanges 62 around the medial portion thereof to straddle the wall of the tank 6 around the opening 56. The flanges 62 are suitably bolted to the wash tank 6 to support the heater 54 in the wash tank, and suitable sealing rings or gaskets (not shown) are preferably provided between the flanges 62 and the wall of the wash tank 6 to prevent a leakage of liquid from the wash tank through the opening 56 around the heater 54.

The shield 58 is preferably of a length to extend substantially all the way through the wash tank 6 and to project from the wash tank 6 a distance equal to substantially the diameter of the wash tank. Also, the lower half of the shield 58 is preferably removed from a point 64 just inwardly of the flanges 62 to the inner end 66 of the shield, such that water separated in the shield before the crude oil stream enters the wash tank 6 will fall immediately into the lower end portion of the wash tank 6, as will be more fully hereinafter set forth. An annular plate 68 is welded or otherwise suitably secured on the outer end of the shield 58 and extends inwardly into connection with the outer end of the tubular fire box 60 to support the fire box 60 in the shield 58 in the manner of a cantilever. In other words, the inner end portion 70 of the fire box 60 is suspended freely in the wash tank 6, such that the fire box may expand or contract without damage to any portion of the heater construction or the wash tank 6.

Figure 4:
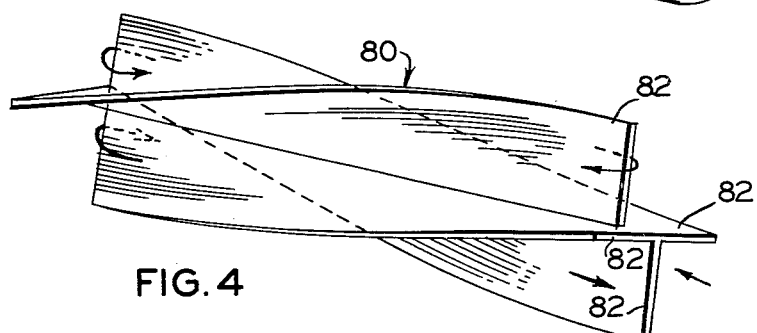
Figure 4 is a perspective view of a preferred baffle construction for use in the fire box of the heater.

An end plate 72 is secured over the inner end of the fire box 60, and another end plate 74 is secured over the outer end of the fire box 60. The innermost end plate 72 is solid, whereas the outer end plate 74 is provided with two openings therethrough to receive a fuel line 76 and a flue 78. It is preferred that the fuel line 76 extend into the lower portion of the fire box 60 to initiate combustion in the outer lower end portion of the fire box. The products of combustion are directed in a circuitous path through the fire box 60 by a novel baffle assembly generally designated by reference character 80 and shown in detail in Fig. 4 to provide a maximum distribution of heat around the fire box 60.

The baffle asesmbly 80 comprises four fins 82 extending lengthwise through the fire box 60 and connected at substantially 90 degrees from one another. The fins 82 are twisted lengthwise to direct the products of combustion in a substantially spiral path through the fire box 60. Also, the end of one of the fins 82 adjacent the plate 74 of the fire box is cut-off, and the ends of two adjacent fins 82 are cut-off near the end plate 72, such that the products of combustion will be directed lengthwise through the fire box 60 in a substantially spiral path in four passes through the fire box 60 as illustrated by the arrows in both Figs. 1 and 4. It will be apparent that the baffle assembly 80 is arranged in the fire box 60 such that the products of combustion will be directed from the fuel line 76 lengthwise into the fire box, and the cooled products of combustion will be exhausted through the flue 78.

An inlet 84 is provided in the lower outer end portion of the shield 58 for connection with the crude oil supply line 22 downstream of the gas riser 24. Thus, the crude oil stream, which will consist of substantially all oil and water downstream of the gas riser 24, is injected into the lower outer end portion of the shield 58 for flow through the shield 58 around the fire box 60 into the wash tank 6. This crude oil stream will be subjected to heat radiated from the lower outer end portion of the fire box 60 immediately upon entering the shield 58 to enhance the early separation of the oil and water components. Also, the free water in the crude oil stream will immediately gravitate to the lower portion of the shield 58 as the crude oil stream progresses through the shield toward the wash tank 6. This separated water will immediately fall into the lower end portion of the wash tank 6 upon entering the wash tank, since the lower half portion of the shield 58 is removed immediately inward of the opening 56.

The remaining portion of the crude oil stream, which will consist of a major portion of oil and a minor portion of water and gas, will flow on through the upper portion of the shield 58 around the fire box 60 and be heated by the heat radiating from the fire box to provide a further separation of water from the oil. That portion of the crude oil stream reaching the inner end 66 of the shield 58, being lighter than the water in the wash tank 6, will rise in the side of the wash tank 6 opposite the opening 56 and will then be directed inwardly into the tank by a suitable baffle 86 secured to the respective side of the wash tank 6. The baffle 86 is secured at a level slightly above the shield 58 to the side of the wash tank 6 opposite the opening 56 and extends inwardly in the tank 6 to substantially the middle of the tank. Also, the baffle 86 is preferably semicircular in cross-section to direct the oil gravitating upwardly from the inner end 66 of the shield 58 back into the central portion of the wash tank 6. This oil will therefore be subjected to a substantial flow path through the wash tank 6 and to the maximum action of the brine water in the wash tank for a substantially complete removal of all water from the oil. It will be apparent that this oil will rise from the inner end of the baffle 86 into the upper portion of the wash tank 6 above the level 10 for removal through the outlet conduit 16.

I prefer to provide a suitable check valve 88 in the conduit 22 between the riser 24 and the heater 54 to prevent a retrograde flow of liquid from the wash tank 6 in the event the flow of the crude oil stream through the conduit 22 is interrupted. Also, a suitable hand operated valve 90 may be interposed in the conduit 22 downstream of the check valve 88 to completely close off the wash tank 6 in the event repairs are required to the heater 54 or the wash tank.

From the foregoing it will be apparent that the present invention provides a novel system for separating the oil, water and gas components of a crude oil stream in an economical and efficient manner. The free gas in the crude oil stream is separated upstream of the wash tank, such that the minimum of gas will be passed through the water and the oil in the wash tank to interfere with the stratification of the oil and water. The oil and water components are efficiently separated by a novel heater construction which subjects the crude oil stream to the maximum heat in the most efficient manner. The free water in the crude oil stream will be subjected to a substantially smaller amount of heat than the remainder of the crude oil stream and will be immediately separated from the crude oil stream upon entering the wash tank. The substantially pure oil portion of the crude oil stream is subjected to the maximum amount of heat and the maximum amount of washing in the wash tank. The novel heater construction provides an efficient distribution of heat in the fire box to minimize the possibility of hot spots being created, and to minimize the deposition of salt or other foreign matter on the fire box which would interfere with efficient radiation of heat from the fire box to the crude oil stream. It will also be apparent that the present system and the present heater construction are simple in construction, may be economically manufactured and will have a long service life.

Changes may be made in the combination and arrangement of parts or elements as heretofore set forth in the specification and shown in the drawings without departing from the spirit and scope of the invention as defined in the following claims.

I claim:

1. In combination with a crude oil wash tank or the like having an opening in one side wall thereof, a heater, comprising a tubular shield of a size to extend horizontally through the opening and having a length equal to substantially twice the diameter of the wash tank, flanges around the central portion of the shield for engaging the tank around the edge of said opening to support the shield with substantially one half its length inside the tank and substantially one half its length outside the tank and to prevent leakage between the shield and the periphery of the opening, the inner end of the shield being open and suspended freely in the tank, a fire box secured in the outer end of the shield and extending inwardly in the shield in the manner of a cantilever, said fire box having a length substantially equal to the length of the shield, the outer end of the shield being closed around the fire box, a fuel supply line connected to the outer end of the fire box for directing combustion gases into the fire box, an exhaust flue communicating with the outer end of the fire box for discharging the products of combustion, a crude oil inlet in the outer end portion of the shield below the fire box, whereby the various components of the crude oil will be at least partially separated prior to entering the wash tank, and a plurality of baffles in said fire box, said baffles cooperating to direct the products of combustion from the fuel supply line to the inner end of the fire box and back to the exhaust flue.

2. A heater as defined in claim 1 wherein said baffles are in the form of an elongated member having an X-shaped cross-section intermediate its length and a T-shaped cross-section at its ends and being twisted along its length to direct the products of combustion in a spiral path along the length of the fire box.

3. A heater as defined in claim 2 wherein the fuel supply line is connected to the lower portion of the fire box at a point immediately above said crude oil inlet to initially direct the products of combustion along the lower outer end portion of the fire box.

4. The combination claimed in claim 1 characterized further to include a generally semi-cylindrical baffle secured to the side wall of said tank opposite said opening and inclined upwardly at an acute angle to said wall, said baffle extending over the open inner end of said shield in generally concentric relation to said shield whereby crude oil passing out of said heater into said tank will be deflected into a devious path in its passage from the heater to the upper portion of said tank.

References Cited in the file of this patent

UNITED STATES PATENTS

| | | |
|---|---|---|
| 297,009 | Roberts | Apr. 15, 1884 |
| 2,666,445 | Cronkhite | Jan. 19, 1954 |
| 2,706,015 | Bills | Apr. 12, 1955 |
| 2,825,422 | Schoenfeld | Mar. 4, 1958 |
| 2,852,139 | Lowery | Sept. 16, 1958 |